(12) United States Patent
Suzuki

(10) Patent No.: US 12,459,185 B2
(45) Date of Patent: Nov. 4, 2025

(54) SCREW MACHINE WITH A ROTATABLE FILTER IN A DEAERATION PORT

(71) Applicant: Shibaura Machine Co., Ltd., Tokyo (JP)

(72) Inventor: Shozo Suzuki, Numazu (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 540 days.

(21) Appl. No.: 18/000,447

(22) PCT Filed: Aug. 17, 2021

(86) PCT No.: PCT/JP2021/030028
§ 371 (c)(1),
(2) Date: Dec. 1, 2022

(87) PCT Pub. No.: WO2022/044884
PCT Pub. Date: Mar. 3, 2022

(65) Prior Publication Data
US 2023/0211538 A1 Jul. 6, 2023

(30) Foreign Application Priority Data
Aug. 24, 2020 (JP) ................................. 2020-141257

(51) Int. Cl.
*B29C 48/76* (2019.01)
*B29B 7/48* (2006.01)
*B29C 48/405* (2019.01)

(52) U.S. Cl.
CPC .............. *B29C 48/767* (2019.02); *B29B 7/48* (2013.01); *B29C 48/405* (2019.02); *B29C 48/763* (2019.02)

(58) Field of Classification Search
CPC ..... B29C 48/767; B29C 48/405; B29C 48/40; B29C 48/41; B29C 48/691; B29C 48/766; B29C 48/27; B29C 2948/92514; B29C 48/692; B29C 48/763; B29C 48/92; B29C 48/69; B29C 48/76; B29B 7/48; B29B 7/823; B29B 7/826; B29B 7/58; B29B 7/728; B29B 7/488; B29B 7/483;
(Continued)

(56) References Cited

U.S. PATENT DOCUMENTS

| | | | | |
|---|---|---|---|---|
| 4,491,417 A * | 1/1985 | Hold | ...................... | B29C 48/763 366/90 |
| 8,360,627 B2 * | 1/2013 | Stirner | ...................... | B29B 7/845 366/75 |
| 9,688,003 B2 * | 6/2017 | Stirner | ...................... | B29C 48/763 |

(Continued)

FOREIGN PATENT DOCUMENTS

| CN | 103831962 A | 6/2014 | |
|---|---|---|---|
| DE | 202012001277 U1 * | 11/2012 | ............. B29C 48/69 |

(Continued)

*Primary Examiner* — Charles Cooley
(74) *Attorney, Agent, or Firm* — Foley & Lardner LLP

(57) ABSTRACT

An extruder is provided with: a screw rotationally driven about the axis by a first motor; a barrel having a screw hole into which the screw is inserted and a de-airing port configured to discharge air inside the screw hole; a filter configured such that a part thereof faces the de-airing port of the barrel; and a filter-driving mechanism configured to move the filter to shift the part of the filter facing the de-airing port.

4 Claims, 7 Drawing Sheets

(58) Field of Classification Search
CPC ... B29B 7/845; B29B 7/86; B29B 7/486; B29B 7/84
USPC ......... 366/75, 79, 83–85; 425/204, 208–209, 425/203; 96/11, 266, 194
See application file for complete search history.

(56) References Cited

U.S. PATENT DOCUMENTS

| | | | |
|---|---|---|---|
| 2008/0248152 A1* | 10/2008 | Samann | B29C 48/767 |
| | | | 425/208 |
| 2010/0202243 A1* | 8/2010 | Stirner | B29C 48/39 |
| | | | 366/139 |
| 2014/0338534 A1* | 11/2014 | Stirner | B29C 48/288 |
| | | | 96/194 |

FOREIGN PATENT DOCUMENTS

| | | | | |
|---|---|---|---|---|
| DE | 102012217579 A1 | * | 3/2014 | ............ B29B 7/86 |
| EP | 2 662 196 A1 | | 11/2013 | |
| JP | 09262830 A | * | 10/1997 | |
| JP | 2002210805 A | * | 7/2002 | ............ B29B 7/845 |
| JP | 2003-071831 A | | 3/2003 | |
| JP | 2010253804 A | * | 11/2010 | .......... B29C 48/763 |
| JP | 2014-223804 A | | 12/2014 | |
| WO | WO-2022044884 A1 | * | 3/2022 | ............ B29C 48/76 |

\* cited by examiner

SCREW MACHINE WITH A ROTATABLE FILTER IN A DEAERATION PORT

TECHNICAL FIELD

The present invention relates to a screw machine.

BACKGROUND ART

JP2014-223804A discloses a screw machine for feeding and processing a bulk material. This screw machine is provided with a casing, a shaft that is provided in the casing, a screw component that is provided on an outer circumference of the shaft, and a filter that is detachably arranged on an opening portion of the casing for performing degassing of the bulk material.

SUMMARY OF INVENTION

As described in JP2014-223804A, in the screw machine, the opening portion may be provided in the casing in order to perform degassing (de-airing) of the material, and a filter may be provided on the opening portion such that the material inside the casing is not discharged through the opening portion.

Such a filter may be clogged by the material adhered on its surface. Thus, in the screw machine, it is required to perform maintenance work of the filter such as replacement or washing of the filter after removal of the filter from the screw machine. Such a maintenance work needs to be performed in a state in which operation of the screw machine is stopped, causing deterioration of a productivity achieved by the screw machine.

An object of the present invention is to provide a screw machine capable of improving a productivity.

According to an aspect of the present invention, a screw machine is provided with: a screw rotationally driven about the axis by a driving source; a barrel having a screw hole into which the screw is inserted and an outlet configured to discharge air contained within a material inside the screw hole; a filter configured such that a part thereof faces the outlet of the barrel; and a filter driving unit configured to move the filter to shift the part of the filter facing the outlet.

DESCRIPTION OF EMBODIMENTS

Figure 1:
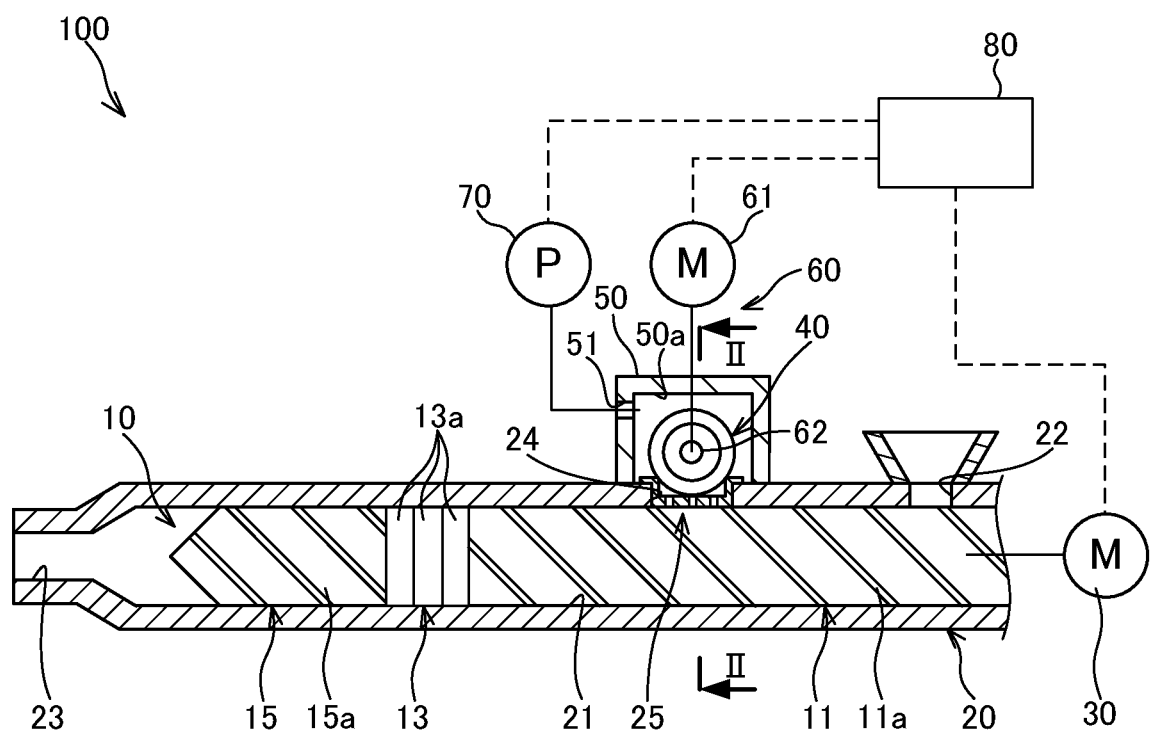
FIG. 1 is a sectional view showing an overall configuration of an extruder according to the embodiment of the present invention.

A screw machine according to embodiments of the present invention will be described below with reference to the drawings. In each of the drawings, for the sake of convenience of description, the scales of the respective configurations are changed appropriately, and they are not necessarily illustrated strictly. In addition, only a part of a plurality of identical components is assigned the reference numerals, and the reference numerals may be omitted for other components.

A screw machine in this embodiment is an extruder in which a granular or powdery material fed into a screw hole 21 of a barrel 20 is kneaded while being carried by screws 10a and 10b, and the kneaded material is extruded from an outlet 23 of the barrel 20. In the following, the screw machine in this embodiment will be described in terms of "an extruder 100".

Figure 2:
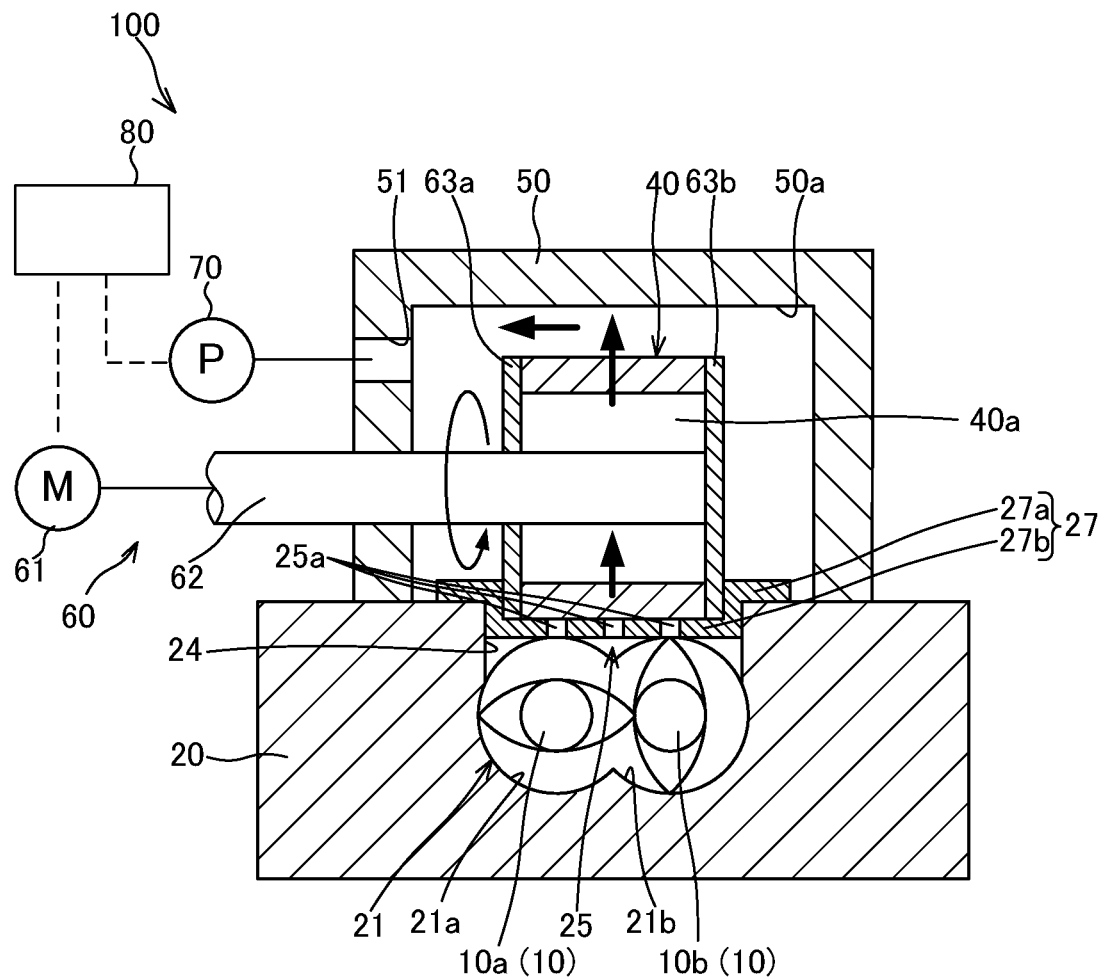
FIG. 2 is a sectional view showing the extruder according to the embodiment of the present invention and is a sectional view taken along line II-II in FIG. 1.

As shown in FIGS. 1 and 2, the extruder 100 is provided with a pair of screws 10a and 10b, the barrel 20 having the screw hole 21 into which the pair of screws 10a and 10b are inserted, a first motor 30 serving as a driving source that rotates the pair of screws 10a and 10b in the screw hole 21, and a controller 80 that controls operation of the extruder 100. As described above, the extruder 100 is a so called twin screw extruder provided with the pair of screws 10a and 10b.

As shown in FIG. 1, the barrel 20 is formed so as to extend in one direction and is a tubular member in which a pair of insertion holes 21a and 21b (see FIG. 2) are formed along the longitudinal direction. The pair of insertion holes 21a and 21b are communicated with each other, and the screw hole 21 is formed by the pair of insertion holes 21a and 21b.

On a first end of the barrel 20 in the longitudinal direction, a feed port 22 for feeding the material into the screw hole 21 is formed so as to open to the screw hole 21. On a second end of the barrel 20 in the longitudinal direction, the outlet 23 for discharging the mixed material made of the molten and kneaded material is formed so as to open to the screw hole 21. In the following, in the screw hole 21, the side on the feed port 22 (the right side in FIG. 1) is also referred to as "the upstream side" of the screw hole 21, and the side on the outlet 23 (the left side in FIG. 1) is also referred to as "the downstream side" of the screw hole 21. The material that has been fed into the screw hole 21 through the feed port 22 is carried to the downstream by the screws 10a and 10b and is discharged outside the barrel 20 through the outlet 23.

In addition, although illustration is omitted, the barrel 20 is provided with a heater that heats the barrel 20, a cooler that cools the barrel 20, a vacuum device that removes air, a temperature sensor that detects temperature of the barrel 20, and so forth.

As shown in FIG. 2, the pair of screws 10a and 10b have the similar shapes and are provided so as to extend in parallel with each other. The screws 10a and 10b are inserted into the screw hole 21 of the barrel 20 such that they are engaged with each other. The pair of screws 10a and 10b are rotated in the same direction about the respective center axes (the axes) by the first motor 30 (see FIG. 1). In other words, the pair of screws 10a and 10b are rotated synchronously with each other. In the following, the pair of screws 10a and 10b are collectively simply referred to as a "screw 10", and the specific configurations thereof will be described.

As shown in FIG. 1, the screw 10 is a shaft member that is provided along the longitudinal direction of the barrel 20 from a base end, which is connected to the first motor 30, towards a tip end. The base end of the screw 10 is located at the upstream side of the screw hole 21, and the tip end is located at the downstream side of the screw hole 21.

The screw 10 has a conveying part 11 that conveys the material in the screw hole 21 towards the downstream, a kneading part 13 that melts and mixes the material in the screw hole 21, and a tip end part 15 that discharges the thus-mixed material in the screw hole 21 from the outlet 23. The conveying part 11, the kneading part 13, and the tip end part 15 are provided on the screw hole 21 in this order from the upstream towards the downstream.

The conveying part 11 has a spiral flight 11a (a screw blade) on its outer circumference. The material fed to the screw hole 21 from the feed port 22 is conveyed towards the kneading part 13 on the downstream side by the conveying part 11 of the screw 10 being rotated.

The kneading part 13 is configured of a plurality of kneading discs 13a that are arranged in the longitudinal direction (the axial direction of the screw 10). The kneading part 13 melts and mixes the thus-conveyed material.

The tip end part 15 has a spiral flight 15a on its outer circumference. The material melted by the kneading part 13 is extruded from the outlet 23 by the tip end part 15 and is discharged outside the barrel 20.

The first motor 30 is an electric motor, and its operation is controlled by the controller 80. The rotation of the first motor 30 is transmitted to the pair of screws 10a and 10b via a speed reducer (not shown). With such a configuration, the pair of screws 10a and 10b are rotationally driven by the first motor 30.

The controller 80 is formed of a micro-computer including a CPU (a central processing unit), a ROM (a read only memory), a RAM (a random access memory), and an I/O interface (input/output interface). The RAM stores data for processing in the CPU, and the ROM stores a control program, etc. of the CPU in advance, and the I/O interface is used for inputting/outputting information from/to connected apparatuses. The controller 80 is programed so as to be at least capable of executing processing required for executing control according to this embodiment or a modification thereof. The controller 80 may be configured as a single device, or the controller 80 may be configured such that the controller 80 is divided into a plurality of devices, and the respective controls are processed by the plurality of devices in a distributed manner.

In addition, the extruder 100 is provided with: a cylindrical filter 40 that faces a de-airing port 25 provided in the barrel 20; a filter housing 50 that has an accommodating space 50a for accommodating the filter 40 and that is attached to the barrel 20; a filter-driving mechanism 60 serving as a filter driving unit that rotates the filter 40; and a vacuum pump 70 that sucks the air in the screw hole 21 from the de-airing port 25 via the filter 40.

As shown in FIG. 2, the barrel 20 is provided with an opening portion 24 that communicates with the screw hole 21 and opens to the outside the barrel 20, and a cover 27 that closes the opening portion 24.

Figure 3:
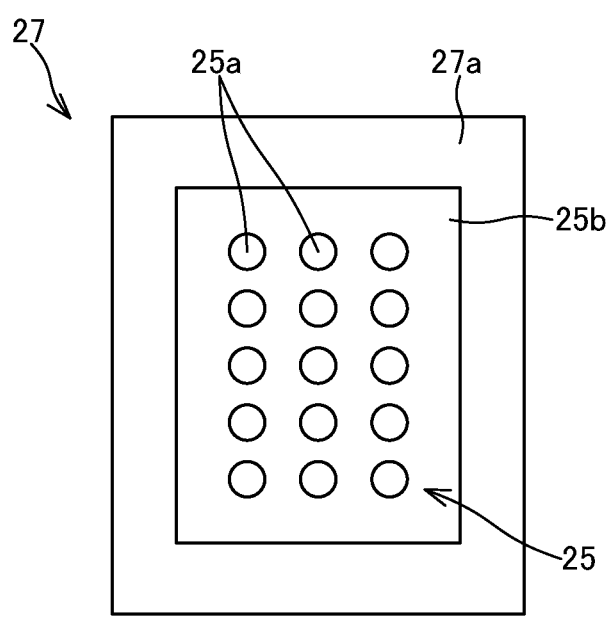
FIG. 3 is a plan view of a cover of the extruder according to the embodiment of the present invention.

The cover 27 has a flange portion 27a that is attached to the barrel 20 with bolts, etc. (not shown) and a cover portion 27b that covers the opening portion 24 by being inserted into the opening portion 24. As shown in FIG. 3, the cover portion 27b is formed with a plurality of through holes 25a that communicate with the screw hole 21. The de-airing port 25 is configured with the plurality of through holes 25a. The through holes 25a are each a circular hole and are formed to have the same shape with each other. In FIG. 3, illustration of reference signs for parts of the through holes 25a is omitted.

As shown in FIG. 1, the de-airing port 25 (the opening portion 24 of the barrel 20) is provided so as to open to the screw hole 21 on the upstream side of the kneading part 13 of the screw 10. In other words, the de-airing port 25 is provided at a position opposing to the conveying part 11 between the kneading part 13 of the screw 10 and the feed port 22 in the axial direction of the screw 10 (the longitudinal direction of the barrel 20).

As shown in FIG. 2, the filter 40 is formed to have a cylindrical shape having an internal space 40a. The filter 40 allows passage of the air, but restricts (blocks) passage of the powdery material. The filter 40 is made of a nonwoven fabric, a porous material, a metallic perforated plate (such as a perforated metal, a metal mesh, or the like), and so forth. In addition, the filter 40 may be made of a single filter member formed of the porous material, the nonwoven fabric, the metallic perforated plate, and so forth, or the filter 40 may also be an assembled filter that is made by assembling a plurality of filter materials with different material qualities and properties (pore size, etc.). The filter 40 is arranged such that a part of a cylindrical outer circumferential surface comes into contact with the cover portion 27b of the cover 27, or such that the part of the cylindrical outer circumferential surface extends along the cover portion 27b such that a small gap is formed therebetween. The gap is small enough to still allow the filter 40 to capture the powdery material discharged outside the screw hole 21 through the de-airing port 25. Therefore, the part of the outer circumferential surface of the filter 40 faces the de-airing port 25.

As shown in FIG. 2, the filter housing 50 is formed to have a box shape with an opening on one end, and the opening end is attached to the barrel 20. The filter 40 is accommodated, as a whole, in the accommodating space 50a formed in the filter housing 50. The filter housing 50 is formed with a suction port 51 that opens to the accommodating space 50a.

The filter-driving mechanism 60 has a second motor 61 that is the electric motor, a rotation shaft 62 that is connected to a rotating shaft (not shown) of the second motor 61 and to which the output rotation of the rotating shaft is transmitted, and a pair of attachment plates 63a and 63b that are respectively attached to end portions of the filter 40. The rotating shaft of the second motor 61 is connected to a base end (not shown) of the rotation shaft 62.

The pair of attachment plates 63a and 63b are respectively attached to both end portions of the filter 40 so as to close the internal space 40a. The pair of attachment plates 63a and 63b are each a disc-shaped plate having substantially the same outer diameter as the filter 40. The rotation shaft 62 is inserted through the attachment plate 63a on one side and the internal space 40a of the filter 40 so as to extend along the center axis of the filter 40, and a tip end of the rotation shaft 62 is connected to the attachment plate 63b on the other side. In other words, the rotation shaft 62 is connected to the filter 40 via the attachment plate 63b. As the rotation of the output shaft of the second motor 61 is transmitted to the rotation shaft 62, the filter 40 is rotated about its center axis together with the rotation shaft 62. The rotation shaft 62 (the center axis of the filter 40) is provided so as to extend perpendicularly to the center axis of the screw 10 (see FIG. 1) and so as to extend in parallel with respect to the direction in which the pair of screws 10 are arranged adjacently (the direction between the axes: the left-right direction in FIG. 2).

The vacuum pump 70 sucks the air inside the accommodating space 50a through the suction port 51 of the filter housing 50. With such a configuration, the air inside the screw hole 21 is sucked into the vacuum pump 70 through the filter 40 from the de-airing port 25. Because a known configuration can be employed as the vacuum pump 70, a detailed description and illustration thereof will be omitted.

The operations of the second motor 61 and the vacuum pump 70 of the filter-driving mechanism 60 are controlled by the controller 80.

Next, the effects of the extruder 100 will be described.

When the extruder 100 is operated, the first motor 30 is controlled by the controller 80 such that the pair of screws 10 are rotated in the same direction at the same speed.

The powdery material that is fed into the screw hole 21 through the feed port 22 is conveyed by the conveying part 11 of the screw 10 towards the downstream in the longitudinal direction. At this time, the air may enter inside the screw hole 21 together with the material. As the air enters inside the screw hole 21, the material cannot be fed into the screw hole 21 by a corresponding amount. In other words, the feeding of the material is inhibited by the air in the screw hole 21.

In contrast, in the extruder 100, because the de-airing port 25 is provided in the barrel 20, the air that has entered inside the screw hole 21 together with the material is discharged outside the screw hole 21 through the de-airing port 25. Specifically, the air inside the screw hole 21 is discharged to the accommodating space 50a of the filter housing 50 from the de-airing port 25 through the filter 40 by pressure applied to the material by the conveying part 11 of the screw 10 and the suction force for the air by the vacuum pump 70. The air that has discharged to the accommodating space 50a is sucked into the vacuum pump 70 through the suction port 51. Thus, it is possible to suppress the inhibition of the feeding of the material into the screw hole 21 caused by the air that has entered inside the screw hole 21.

In addition, the filter 40 is rotated continuously by the second motor 61 at a constant speed. Thus, a portion of the outer circumferential surface of the filter 40 that faces the de-airing port 25 (hereinafter, this portion is also referred to as "filter face") is successively shifted along with the rotation of the filter 40. In other words, the extruder 100 is configured such that the filter 40 does not constantly faces the de-airing port 25 at the same part thereof and different parts of the filter 40 successively face the de-airing port 25 as fresh filter faces along with the rotation of the filter 40. As described above, because the filter face facing the de-airing port 25 (in other words, the material inside the screw hole 21) is renewed by the rotation of the filter 40, the clogging of the filter 40 becomes less likely to be caused. Thus, occurrence of a maintenance work of the filter 40 due to the clogging can be suppressed, and it is possible to improve productivity achieved by the extruder 100.

In addition, in the extruder 100, the filter 40 is provided on the outer side of the screw hole 21, and the screw hole 21 is provided on the outer side of the filter 40. The outer circumferential surface having the cylindrical shape of the filter 40 faces the de-airing port 25 as the filter face, and the filter 40 is rotated by the second motor 61. As the filter 40 is rotated by the second motor 61, the filter face of the filter 40 is moved about the rotation shaft 62 in the accommodating space 50a and comes to face the de-airing port 25 again.

As described above, the filter 40 is formed to have the cylindrical shape, and thereby, it is configured so as to be rotationally moved in the accommodating space 50a. Therefore, as shown in FIG. 2, the part of the air discharged outside the screw hole 21 from the de-airing port 25 is guided from the outside to the inside of the filter 40 (the internal space 40a), and then guided to the suction port 51 after passed through the filter 40 again from the inside towards the outside of the filter 40 (see the arrows in FIG. 2). Thus, even if the powdery material is adhered to the filter face facing the de-airing port 25, it is possible to remove the material adhered to the outer circumferential surface of the filter 40 by the flow of the air directed from the inside to the outside of the filter 40. Because it is possible to remove the material adhered to the filter 40 by the flow of the air sucked by the vacuum pump 70, it is possible to further suppress the clogging of the filter 40. Therefore, the need to stop the extruder 100 for the maintenance of the filter 40 can be suppressed, and thus, it is possible to improve the productivity by continuously operating the extruder 100.

In addition, in the extruder 100, the de-airing port 25 of the barrel 20 is configured with the plurality of through holes 25a. In addition to the filter 40 that is provided so as to face the de-airing port 25, the de-airing port 25 itself exhibits the function as the filter that allows the passage of the air, but restricts the passage of the material. In other words, the cover portion 27b of the cover 27 on which the de-airing port 25 is provided is configured like the perforated metal. Thus, it is possible to reduce the load for the filter 40 caused due to removal of foreign matters and to further suppress the clogging of the filter 40.

The de-airing port 25 is configured such that the pore size thereof is larger than the pore size of the filter 40. Expressed from the other viewpoint, the permeability of the de-airing port 25 is higher than the permeability of the filter 40, and on the contrary, the pressure loss of the gas passing through the de-airing port 25 is smaller than the pressure loss of the gas passing through the filter 40. Thus, it is possible to configure the extruder 100 such that the filter 40 mainly covers the function of removing the material discharged from the screw hole 21 together with the gas.

Next, modifications of this embodiment will be described. The modifications described below also fall within the scope of the present invention. It may also be possible to combine the following modifications with the respective configurations in the above-described embodiment, and it may also be possible to combine the following modifications with each other. In addition, in the respective modifications, the configurations that are similar to those in the above-mentioned embodiment are assigned the same reference signs, and descriptions thereof shall be omitted.

In the above-mentioned embodiment, the filter 40 is formed to have the cylindrical shape and is rotationally moved by the second motor 61. In contrast, the filter 40 is not limited to the cylindrical shape. In addition, the filter 40 is not limited to the configuration in which it is rotationally moved.

Figure 4:
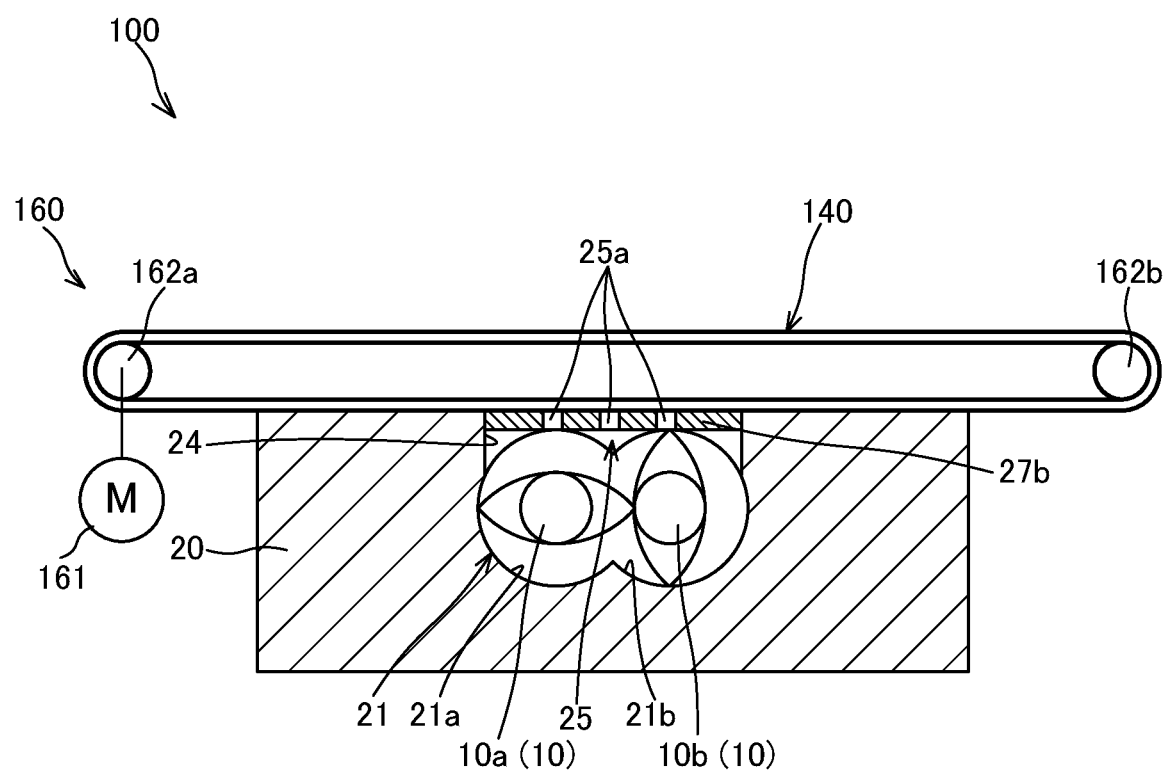
FIG. 4 is a sectional view showing the extruder according to a first modification of the embodiment of the present invention.

In a first modification shown in FIG. 4, a filter 140 is formed to have a belt shape both end of which are connected to form an endless belt. A filter-driving mechanism 160 in the first modification has a pair of rollers 162a and 162b around which the belt-shaped filter 140 is suspended and a third motor 161 that rotationally drives the pair of rollers 162a and 162b. The filter 140 is provided such that a part thereof located between the pair of rollers 162a and 162b faces the de-airing port 25 of the barrel 20. As the pair of rollers 162a and 162b is rotationally driven by the third motor 161, the filter 140 is rotationally moved between the pair of rollers 162a and 162b. With such a configuration, the part of the filter 140 facing the de-airing port 25 is renewed.

Figure 5:
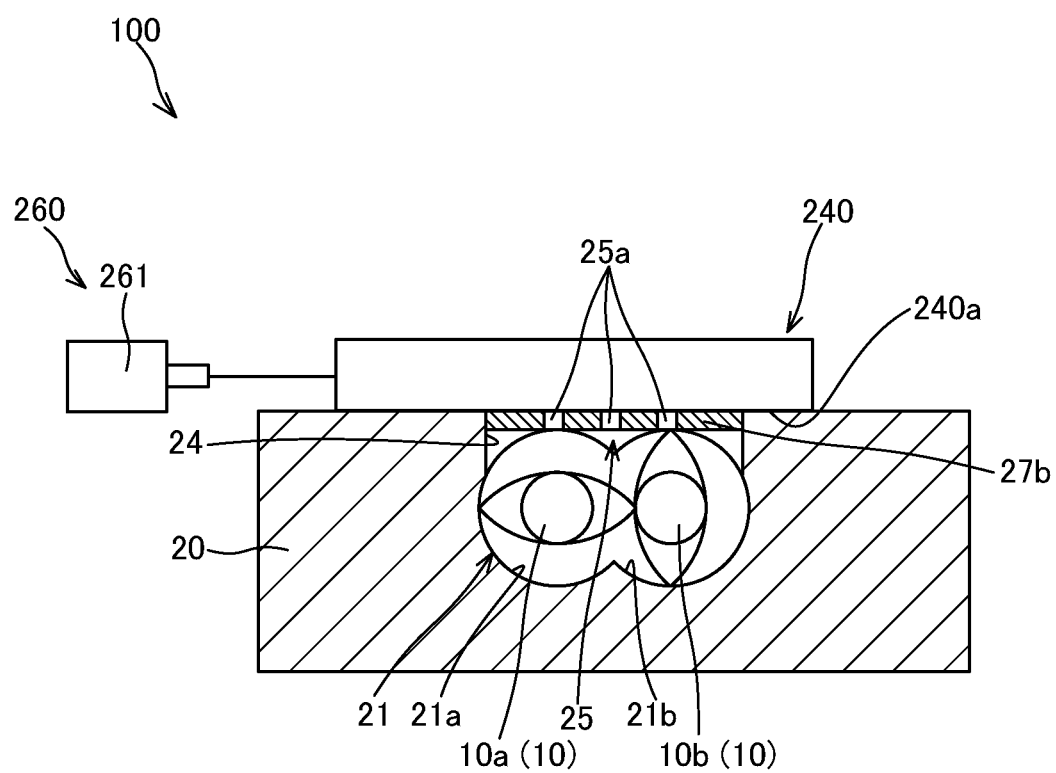
FIG. 5 is a sectional view showing the extruder according to a second modification of the embodiment of the present invention.

In addition, in a second modification shown in FIG. 5, a filter 240 is formed to have a flat plate shape and is arranged such that a wide flat plate surface 240a extending perpendicularly to the plate-thickness-wise direction faces the de-airing port 25. A filter-driving mechanism 260 has an actuator 261 that moves the filter 240 back and forward in the direction in which the pair of screws 10 are arranged adjacently (the direction between the center axes: the left-right direction in FIG. 5). As the actuator 261, for example, a fluid pressure cylinder, or a linear-motion mechanism having an electric motor and a ball screw may be used. The actuator 261 moves the filter 240 in a reciprocating manner such that any one part of the flat plate surface 240a of the filter 240 always faces the de-airing port 25. With such a configuration, the part of the filter 240 facing the de-airing port 25 is renewed.

As described above, the filter may be rotationally moved by being formed to have the belt shape as in the first modification, or it may be linearly moved as in the second modification. In other words, as long as the extruder 100 is configured such that a part of the filter 40, 140, 240 faces the de-airing port 25, and the part (the filter face) of the filter 40, 140, 240 facing the de-airing port 25 is shifted as the filter 40, 140, 240 is moved by the filter-driving mechanism 60, 160, 260, other configurations thereof may have any configurations. Even in the first modification and the second modification as described above, because the part facing the de-airing port 25 in the filter 140, 240 is renewed, it is possible to suppress the occurrence of the maintenance work by preventing the clogging of the filter 140, 240.

Figure 6:
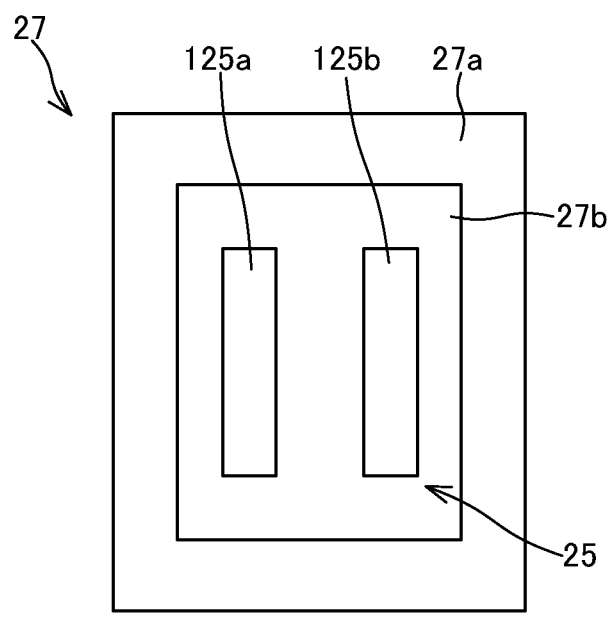
FIG. 6 is a plan view showing the cover of the extruder according to a third modification of the embodiment of the present invention.
Figure 7:
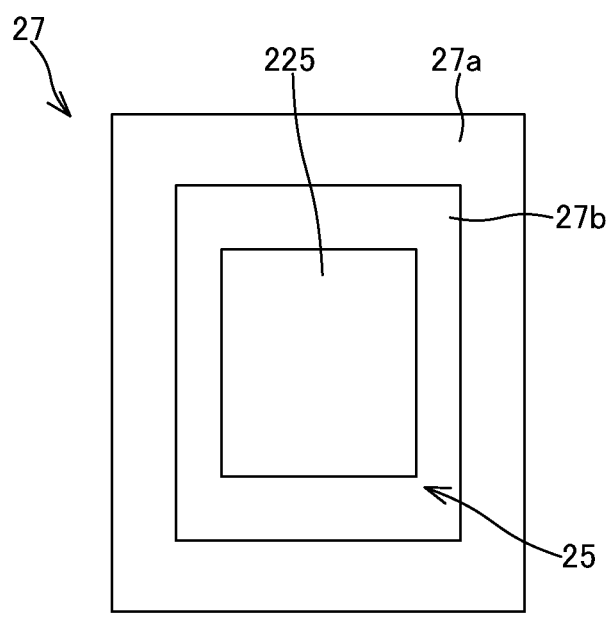
FIG. 7 is a plan view showing the cover of the extruder according to a fourth modification of the embodiment of the present invention.

In addition, in the above-mentioned embodiment, the de-airing port 25 is configured with the plurality of circular through holes 25a. In contrast, the configuration of the de-airing port 25 is not limited to the configuration in the above-mentioned embodiment. For example, as in a third modification shown in FIG. 6, the de-airing port 25 may be configured with a pair of elongate holes 125a and 125b each formed to have a substantially rectangular shape in a plan view. In addition, as in a fourth modification shown in FIG. 7, the de-airing port 25 may also be configured with a single hole 225. In addition, it may be possible to employ a configuration in which the filter 40 faces the opening portion 24 directly by configuring the opening portion 24 formed in the barrel 20 as the de-airing port 25 without providing the cover 27. In other words, the configuration in which the de-airing port 25 functions as the filter is not essential.

In addition, in the above-mentioned embodiment, the second motor 61 of the filter-driving mechanism 60 is controlled by the controller 80 such that the filter 40 is rotated continuously in the same direction at the constant speed (such that the filter 40 is always rotated while the extruder 100 is being operated). In contrast, from the view point of preventing the clogging of the filter 40, although it is preferred that the filter 40 be rotated continuously at the constant speed, the present invention is not limiter thereto. For example, the second motor 61 may be controlled such that the filter 40 is rotated intermittently (periodically) such that the filter 40 is rotated and stopped repeatedly at a predetermined time intervals. Even in this case, because the filter face of the filter 40 facing the de-airing port 25 is renewed, it is possible to suppress the occurrence of the maintenance work by preventing the clogging of the filter 40.

In addition, in the above-mentioned embodiment, the extruder 100 is provided with the vacuum pump 70 that sucks the air inside the screw hole 21; however, the vacuum pump 70 is not an essential configuration. In addition, the extruder 100 may be provided with a remover that removes the material adhered to the filter 40 from the filter 40. As the remover, for example, an air blowing device that is provided in the internal space 40a of the filter 40 and that discharges air from the inside towards the outside of the filter 40 may also be used. By providing the remover, the material adhered to the filter 40 can be removed actively, and therefore, it is especially effective in a case in which the vacuum pump 70 is not provided.

In addition, in the above-mentioned embodiment, the filter 40 is provided such that the center axis thereof (the rotation shaft 62) extends in parallel with respect to the direction in which the pair of screws 10 are arranged adjacently; however, the present invention is not limited to this configuration. For example, the filter 40 may be provided such that the center axis thereof extends in parallel with respect to the longitudinal direction of the barrel 20 (the axis direction of the screw 10).

In addition, in the above-mentioned embodiment, the pair of screws 10a and 10b are rotated in the same direction with each other (see FIG. 2). In contrast, the pair of screws 10a and 10b may be rotated in the opposite directions from each other.

In addition, in the above-mentioned embodiment, the extruder 100 is a so called twin screw extruder provided with the pair of screws 10a and 10b. In contrast, the extruder 100 may be a so called single screw extruder provided with a single screw 10.

In addition, in the above-mentioned embodiment, the screw machine is the extruder 100 that kneads and extrudes the material. In contrast, the screw machine may also be a material feeder (a side feeder) that feeds the material to the extruder 100. The screw 10 of the material feeder is configured of the conveying part 11 only, and the material is conveyed without being kneaded or melted.

In the following, operational advantages of this embodiment will be described.

The extruder 100 is provided with: the screw 10 rotationally driven about the axis by the first motor 30; the barrel 20 having the screw hole 21 into which the screw 10 is inserted and the de-airing port 25 configured to discharge the air inside the screw hole 21; the filter 40 configured such that a part thereof faces the de-airing port 25 of the barrel 20; and the filter-driving mechanism 60 configured to move the filter 40 to shift the part of the filter 40 facing the de-airing port 25.

With this configuration, by moving the filter 40 by the filter-driving mechanism 60, it is possible to renew the filter face of the filter 40 even when the extruder 100 is being operated. Thus, it is possible to suppress the occurrence of the clogging of the filter 40. Therefore, it is possible to suppress the occurrence of the maintenance work of the filter 40 and to improve the productivity achieved by the extruder 100.

In addition, the extruder 100 is further provided with the vacuum pump 70 configured to suck the air inside the screw hole 21 from the de-airing port 25 through the filter 40.

According to this configuration, it is possible to efficiently suck the air inside the screw hole 21 to the outside of the screw hole 21.

In addition, the extruder 100 is further provided with the filter housing 50 having the accommodating space 50a and attached to the barrel 20, the accommodating space 50a being configured to accommodate the filter 40, wherein the vacuum pump 70 is configured to suck the air inside the screw hole 21 through the suction port 51, the suction port 51 being formed in the filter housing 50 so as to open to the accommodating space 50a, the filter-driving mechanism 60 is configured to rotate the filter 40, and as the filter 40 is rotated by the filter-driving mechanism 60, the part of the outer circumferential surface of the filter 40 facing the de-airing port 25 is moved and comes to face the de-airing port 25 in the accommodating space 50a.

With this configuration, a part of the air discharged to the outside of the screw hole 21 from the de-airing port 25 by being sucked by the vacuum pump 70 is guided from the outside to the inside of the filter 40, and then guided to the suction port 51 after passed through the filter 40 again from the inside towards the outside of the filter 40. Thus, even if the powdery material is adhered to the filter face facing the de-airing port 25, it is possible to remove the material adhered to the outer circumferential surface of the filter 40 by the flow of the air directed from the inside to the outside of the filter 40. As described above, because it is possible to remove the material adhered to the filter 40 by the flow of the air sucked by the vacuum pump 70, it is possible to further suppress the clogging of the filter 40. Therefore, the need to stop the extruder 100 for the maintenance of the filter 40 can be suppressed, and thus, it is possible to improve the productivity by continuously operating the extruder 100.

In addition, in the extruder 100, the de-airing port 25 is configured with the plurality of through holes 25a, 125a, 125b.

With this configuration, because the de-airing port 25 functions as the filter 40, the load for the filter 40 can be reduced, and so, it is possible to reduce the clogging of the filter 40.

In addition, in the extruder 100, the filter-driving mechanism 60 is configured to continuously rotate the filter 40 at a constant speed.

With this configuration, it is possible to more effectively suppress the occurrence of the clogging of the filter 40.

In addition, in the extruder 100, the barrel 20 has the feed port 22 for feeding the material into the screw hole 21 and the outlet 23 for discharging the material in the screw hole 21 to outside the barrel 20, the screw 10 has the kneading part 13 configured to mix the material in the screw hole 21 of the barrel 20, and the de-airing port 25 of the barrel 20 opens to the screw hole 21 by being positioned between the kneading part 13 of the screw 10 and the feed port 22 of the barrel 20 in the axial direction of the screw 10.

With this configuration, because the air inside the screw hole 21 can be discharged through the de-airing port 25 at the position closer to the feed port 22, the air that has entered inside the screw hole 21 can be discharged with ease, and it is possible to reduce the risk in that the feed of the material is inhibited in the screw hole 21 due to the air.

Although the embodiments of the present invention have been described in the above, the above-mentioned embodiments merely illustrate a part of application examples of the present invention, and the technical scope of the present invention is not intended to be limited to the specific configurations of the above-described embodiments.

The present application claims priority to Japanese Patent Application No. 2020-141257, filed in the Japan Patent Office on Aug. 24, 2020. The contents of this application are incorporated herein by reference in their entirety.

The invention claimed is:

1. A screw machine comprising:
a screw configured to be rotationally driven about an axis by a driving source;
a barrel having a screw hole into which the screw is inserted and a de-airing port configured to discharge air inside the screw hole;
a filter configured such that a part thereof faces the de-airing port of the barrel;
a filter driving unit configured to move the filter to shift the part of the filter facing the de-airing port;
a vacuum pump configured to suck the air inside the screw hole from the de-airing port through the filter; and
a filter housing having an accommodating space and attached to the barrel, the filter being accommodated in the accommodating space, wherein
the vacuum pump is configured to suck the air inside the screw hole through a suction port, the suction port being formed in the filter housing so as to open to the accommodating space,
the filter driving unit is configured to rotate the filter, and
as the filter is rotated by the filter driving unit, a part of an outer circumferential surface of the filter facing the de-airing port is moved and comes to face the de-airing port again in the accommodating space.

2. The screw machine according to claim 1, wherein the de-airing port is configured with a plurality of holes.

3. The screw machine according to claim 1, wherein the filter driving unit is configured to continuously rotate the filter at a constant speed.

4. The screw machine according to claim 1, wherein
the barrel has a feed port for feeding a material into the screw hole and an outlet for discharging the material in the screw hole to outside the barrel,
the screw has a kneading part configured to knead the material in the screw hole of the barrel, and
the de-airing port of the barrel opens to the screw hole by being positioned between the kneading part of the screw and the feed port of the barrel in an axial direction of the screw.

* * * * *